United States Patent [19]

Kress et al.

[11] Patent Number: 5,141,176

[45] Date of Patent: Aug. 25, 1992

[54] TILT WING VTOL AIRCRAFT

[75] Inventors: Robert W. Kress, Saugerties; David F. Gebhard, Northport, both of N.Y.

[73] Assignee: Grumman Aerospace Corporation, Bethpage, N.Y.

[21] Appl. No.: 713,501

[22] Filed: Jun. 12, 1991

[51] Int. Cl.$^5$ .......................... B64C 3/38; B64C 29/00
[52] U.S. Cl. ...................... 244/7 C; 244/48; 244/56; 244/66
[58] Field of Search .................. 244/7 R, 7 C, 12.4, 244/48, 56, 66

[56] References Cited

U.S. PATENT DOCUMENTS

| | | | |
|---|---|---|---|
| 2,936,968 | 5/1960 | Mazzitelli | 244/7 C |
| 2,969,935 | 1/1961 | Price | 244/7 C |
| 3,107,882 | 10/1963 | Matteson et al. | 244/7 C |
| 3,179,352 | 4/1965 | Nelson | 244/7 C |
| 4,116,405 | 9/1978 | Bacchi et al. | 244/12.4 |
| 4,296,896 | 10/1981 | Kress et al. | 244/12.4 |

FOREIGN PATENT DOCUMENTS

| | | | |
|---|---|---|---|
| 1431272 | 3/1969 | Fed. Rep. of Germany | 244/48 |
| 1271102 | 4/1972 | United Kingdom | 244/7 C |

*Primary Examiner*—Galen Barefoot
*Attorney, Agent, or Firm*—Richard G. Geib; Daniel J. Tick

[57] ABSTRACT

A tilt wing VTOL aircraft has an upper wing with a leading edge, a trailing edge, an inboard area adjacent the fuselage, spaced opposite end tip areas and an upper surface. The wing is pivotally mounted on the fuselage for rotation from a cruise position in which the upper surface of the wing is flush with the upper surface of the fuselage to a hover position in which the wing is perpendicular to the upper surface of the fuselage. The wing has a forward portion in the leading edge of the inboard area affixed to the fuselage and cut out of the wing and an aft portion in the trailing edge of the inboard area affixed to the fuselage and cut out of the wing. Thus, when the wing is in its cruise position it is whole, including the forward and aft portions, whereas when the wing is in its hover position it has a forward cutout at its leading edge in the inboard area corresponding to the forward portion and an aft cutout at its trailing edge in the inboard area corresponding to the aft portion so that the spanwise wing lift distribution is diminished when the wing is in a position other than its cruise position. The forward and aft cutouts produce a vortex along the sides of the fuselage which results in the spanwise wing lift distribution being diminished when the wing is in a position other than its cruise position. This vortex increases the wing tolerance to angle of attack and thus reduces the requirement for propeller bending of the air flow during mid-transition speeds. It also reduces the intensity of center section buffet.

12 Claims, 2 Drawing Sheets

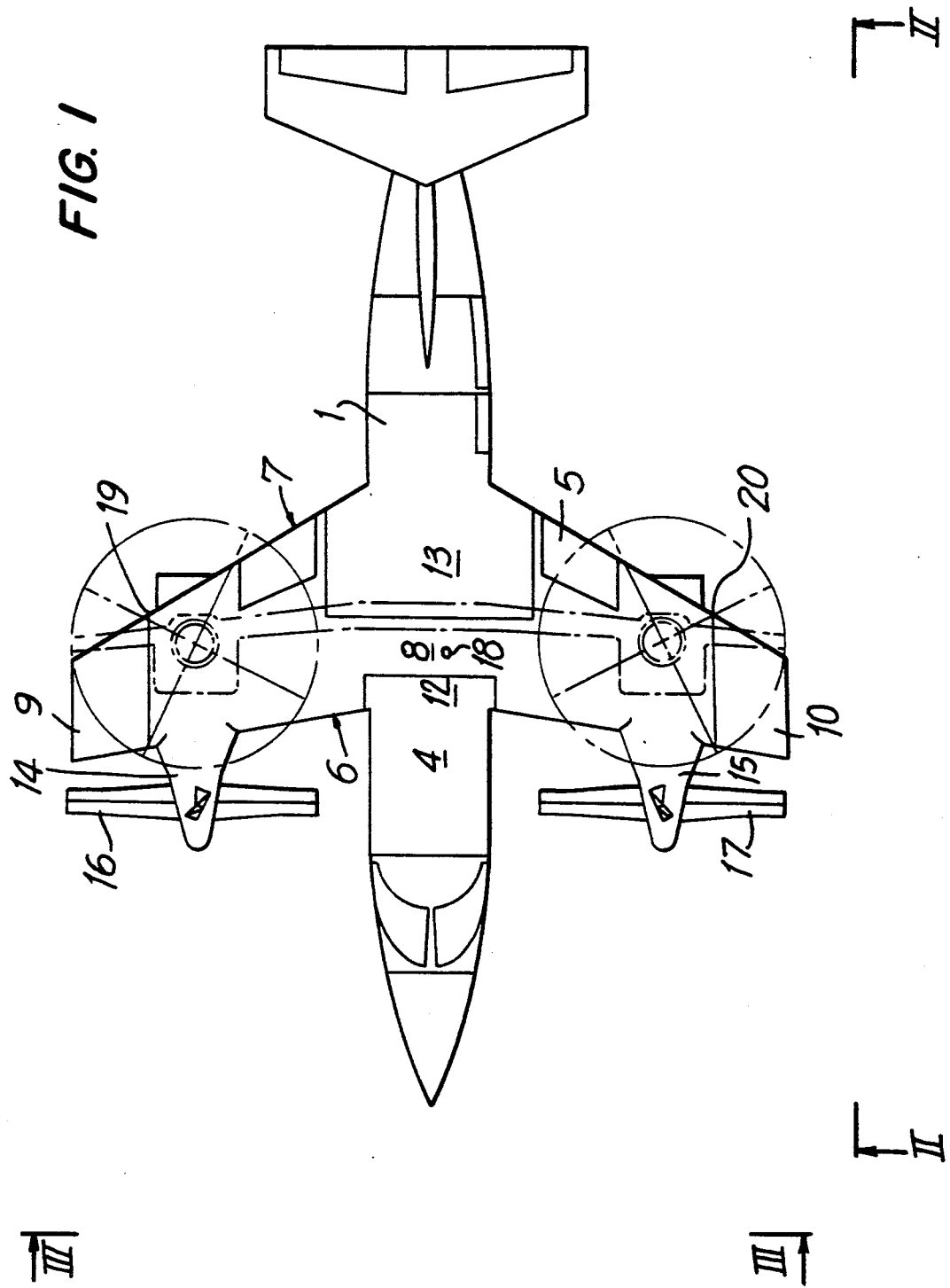

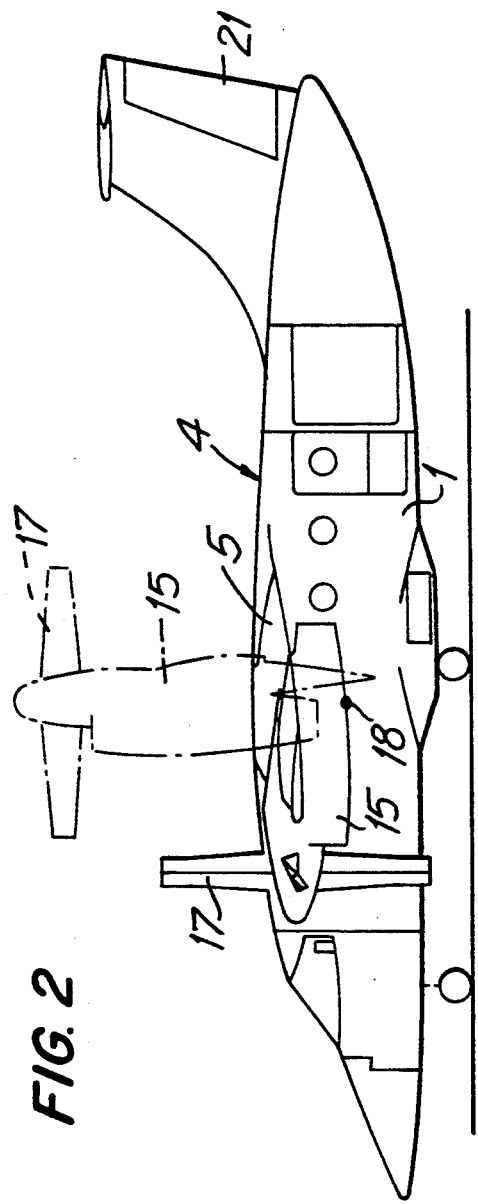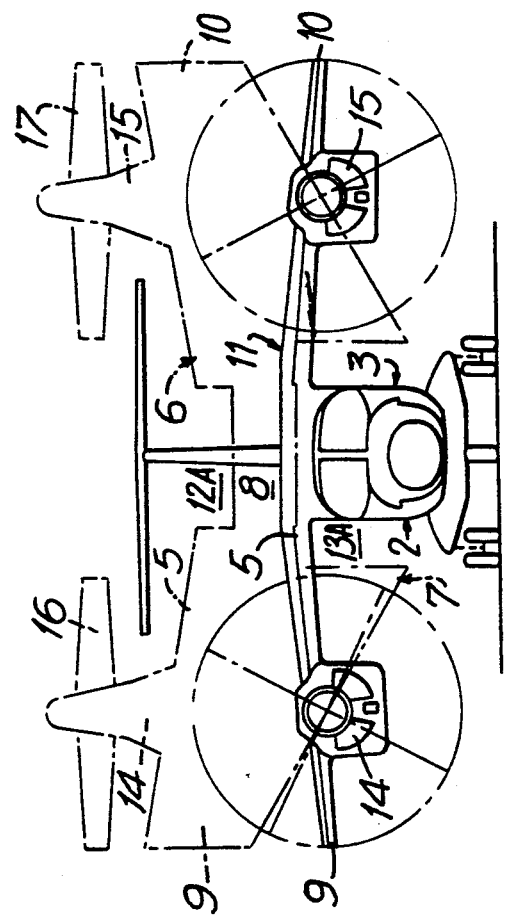

TILT WING VTOL AIRCRAFT

BACKGROUND OF THE INVENTION

The present invention relates to vertical takeoff and landing (VTOL) aircraft. More particularly, the invention relates to tilt wing VTOL aircraft.

There are design issues in known tilt wing VTOL aircraft. There is wing upper surface flow separation with the wing at mid-tilt angles during descending flight, when the propeller is at a reduced power setting and does not bend the air downward sufficiently before it reaches the wing to avoid wing upper surface flow separation. There is a major flow separation and associated buffeting area behind the wing segment over the fuselage at mid-to-high-tilt angles during climbing, level flight and descending transitions between cruise and hover flight, because there is no flow bending by the propeller in that area.

In the prior art, longitudinal pitch control in hover and at low transition speeds was provided by a horizontal variable pitch tail rotor driven by the main engines via shafting and a clutch, so that it may be disengaged in cruise flight. The known pitch control is thus complex and adds weight for equipment which serves no purpose except in hover and low speed flight.

In cruise flight, the propeller disc plane passes through the forward portion of the cabin, generally near the center of gravity. Design practice avoids the placement of passengers in this zone.

The principal object of the invention is to provide a tilt wing VTOL aircraft which functions efficiently, effectively and reliably throughout the speed range from hover to cruise flight at high power.

An object of the invention is to provide a tilt wing VTOL aircraft in which deflection of the wing tip area about a spanwise axis provides pitch control moments in hover and low speed flight.

Another object of the invention is to provide a tilt wing VTOL aircraft having a considerably diminished spanwise wing lift distribution near the center and hence more tolerance to high angles of a attack when the wing is in a position for speeds well below the conventional airplane stall speed, but not in a full hover.

Still another object of the invention is to provide a tilt wing VTOL aircraft which permits low propeller power settings and thus more desirable low speed performance during descent, when the wing is in mid-tilt positions.

Yet another object of the invention is to provide a tilt wing VTOL aircraft having reduced intensity of center section buffet.

An object of the invention is to provide a tilt wing VTOL aircraft having simple pitch control, yaw control and roll control throughout the speed range from hover to cruise flight.

Another object of the invention is to provide a tilt wing VTOL aircraft having an increased fuselage volume near the center of gravity not subject to the hazard of the propeller disc plane.

BRIEF SUMMARY OF THE INVENTION

In accordance with the invention, a tilt wing VTOL aircraft has a fuselage having sides and an upper surface. The fuselage wing assembly comprises an upper wing having a leading edge, a trailing edge, an inboard area adjacent the fuselage, spaced opposite end tip areas and an upper surface. The wing is pivotally mounted on the fuselage near the aft edge of the wing portion which tilts, thus providing for rotation from a cruise flight position in which the upper surface of the wing is substantially flush with the upper surface of the fuselage to a hover position in which the wing is substantially perpendicular to the upper surface of the fuselage. The wing has a forward portion in the leading edge of the inboard area affixed to the fuselage and cut out of the wing and an aft portion in the trailing edge of the inboard area affixed to the fuselage and cut out of the wing, so that when the wing is in its forward flight position it is whole, including the forward and aft portions, whereas when the wing is in a position other than its forward flight position it has a forward cutout at its leading edge in the inboard area corresponding to the forward portion and an aft cutout at its trailing edge in the inboard area corresponding to the aft portion.

Aircraft engines and propellers are mounted on the wing and the propellers extend forward of the leading edge of the wing. The propellers are each coupled to a corresponding one of the aircraft engine units, whereby the forward and aft cutouts reduce the required flow bending by the propellers to avoid upper surface separation and permit low propeller power settings and more desirable descent performance when the wing is at transition tilt angles.

The forward and aft cutouts produce a vortex along each side of the fuselage which results in a spanwise wing lift distribution being substantially diminished at the aircraft center when the wing is in a position substantially diminished at the aircraft center when the wing is in a position other than its cruise position. These vortices reduce the intensity of center section buffet.

Because of these inboard vortices, the part of the wing extending from the vertical side of the fuselage to one of the tip end areas of the wing and the part of the wing extending from the vertical side of the fuselage to the other of the tip end areas behave essentially as separate wings, each having a span essentially extending from the corresponding tip to the corresponding side of the fuselage, and each having an aspect ratio substantially smaller than the aspect ratio of the wing as a whole. The reduction in the aspect ratio substantially increases the angle of attack attainable prior to flow separation on the upper surface of the wing when it is not in its cruise flight position, thus permitting low propeller power settings with the associated reduced bending downward of the flow when said wing is not in the cruise position.

The aircraft center of gravity and the wing forward sweep are arranged in a manner whereby the wing tip areas are above the center of gravity and the propeller slipstream when the wing is in or close to its hover position. Thus, deflection about a spanwise axis of those tip areas in the propeller slipstream produces fore and aft forces above the center of gravity for pitch control.

The wing is a cathedral structure, sloping down as it extends from the fuselage. Each of the wing tip areas is pivotally mounted for rotation about a spanwise axis passing through the airload center of the wing tip areas.

Differential deflection of the wing tip areas in the slipstream of the propellers produces yaw control moments at angles when the wing is in and close to its hover position and at low speeds. Differential propeller thrust control and differential tip deflection also produce roll control at angles when the wing is in and close to its cruise flight position. The aircraft is equipped with a rudder for yaw control at the higher speeds when the wing tilt is at or near the cruise flight position and provides roll control at such speeds.

In accordance with the invention, a tilt wing VTOL aircraft has a fuselage having sides and an upper surface. The fuselage and wing assembly comprises an upper wing having a leading edge, a trailing edge, an inboard area adjacent the fuselage, spaced opposite end tip areas and an upper surface, the wing being pivotally mounted on the fuselage near the aft edge of the wing portion which tilts, thus providing rotation from a cruise flight position in which the upper surface of the wing is substantially flush with the upper surface of the fuselage to a hover position in which the wing is substantially perpendicular to the upper surface of the fuselage. The wing has means for substantially diminishing the spanwise wing lift distribution near the sides of the fuselage when the wing is in a position other than its cruise flight position. Aircraft engines with propellers are mounted on the wing in a manner whereby the propellers extend forward of the leading edge of the wing.

The aircraft has a center of gravity and further comprises means for maintaining the end tip areas above the center of gravity when the wing is in, or close to, its hover position.

In accordance with the invention, a tilt wing VTOL aircraft has a center of gravity, airload centers, a fuselage having sides and an upper surface and a rudder. The fuselage and wing assembly comprises an upper wing having a leading edge, a trailing edge, an inboard area adjacent the fuselage, spaced opposite end tip areas and an upper surface. The wing is pivotally mounted on the fuselage near the aft edge of the wing portion which tilts, thus providing for rotation from a cruise flight position in which the upper surface of the wing is substantially flush with the upper surface of the fuselage to a hover position in which the wing is substantially perpendicular to the upper surface of the fuselage. The wing has a forward portion in the leading edge of the inboard area affixed to the fuselage and cut out of the wing and an aft portion in the trailing edge of the inboard area affixed to the fuselage and cut out of the wing, so that when the wing is in its cruise flight position it is whole, including the forward and aft portions, whereas when the wing is in a position other than its cruise flight position, it has a forward cutout at its leading edge in the inboard area corresponding to the forward portion and an aft cutout at its trailing edge in the inboard area corresponding to the aft portion whereby the spanwise wing lift distribution is substantially diminished. The forward and aft cutouts produce a vortex along the sides of the fuselage which results in the spanwise wing lift distribution being substantially diminished when the wing is in a position other than its cruise flight position and reduces the intensity of center section buffet. Part of the wing extending from one side of the fuselage to one of the tip end areas of the wing and part of the wing extending from the other side of the fuselage to the other of the tip end areas behave essentially as separate wings, each having a span essentially extending from the corresponding tip to the corresponding side of the fuselage and each has an aspect ratio substantially smaller than the aspect ratio of the wing as a whole. The reduction in the aspect ratio substantially increases the angle of attack attainable prior to flow separation of the wing upper surface after movement of the wing from its cruise flight position and flow bending by the propeller is reduced to avoid flow separation. The wing is forward swept in a manner whereby the end tip areas are above the center of gravity when the wing is in, or close to, its hover position. Each of the wing tip areas is pivotally mounted for rotation about a spanwise axis passing near the airload center of the end tip area whereby angular deflection of the wing tip areas in the slipstream of the propellers produces fore and aft forces above the center of gravity thereby producing pitch control moments. Differential deflection of the wing tip areas in the slipstream of the propellers produces yaw control moments at angles when the wing is in, or close to, its hover position and at low speeds and also produces roll control at angles when the wing is in, or close to, its cruise flight position at higher speeds wherein the rudder effectuates yaw control. Aircraft engines and propellers are mounted on the wing. The propellers extend forward of the leading edge of the wing. The wing forward sweep places the propellers forward relative to the fuselage volume near the center of gravity, thus facilitating passenger seating not subject to the hazard of the propeller disc plane.

BRIEF DESCRIPTION OF THE DRAWINGS

In order that the invention may be readily carried into effect, it will now be described with reference to the accompanying drawings, wherein:

FIG. 1 is a top plan view of an embodiment of the tilt wing VTOL aircraft of the invention;

FIG. 2 is a side view of the embodiment of FIG. 2, taken along the lines II—II, of FIG. 1; and FIG. 3 is a front view of the embodiment of FIG. 2, taken along the lines III—III, of FIG. 1.

DETAILED DESCRIPTION OF PREFERRED EMBODIMENT

The tilt wing VTOL (Vertical Takeoff and Landing) aircraft of the invention, shown in FIGS. 1, 2 and 3, has a fuselage 1 having sides 2 and 3 and an upper surface 4. The aircraft has a wing 5 having a leading edge 6, a trailing edge 7, an inboard area 8 adjacent the upper surface 4 of the fuselage 1, spaced opposite end tip areas 9 and 10 and an upper surface 11. The wing 5 is pivotally mounted on the fuselage 1 by any known suitable means for rotation from a forward, or cruise, flight position in which the upper surface 11 of said wing is substantially flush with the upper surface 4 of said fuselage, shown in solid lines in FIGS. 1, 2 and 3, to a hover, or substantially vertical, flight position in which said wing is substantially perpendicular to said upper surface of said fuselage, shown in broken lines in FIGS. 1, 2 and 3.

The wing 5 has a forward portion 12 in the leading edge 6 of the inboard area 8, affixed to the fuselage 1 and cut out of said wing, and an aft portion 13 in the trailing edge 7 of said inboard area affixed to said fuselage and cut out of said wing. Thus, when the wing 5 is in its forward flight position it is whole, including the forward and aft portions 12 and 13, respectively, whereas when said wing is tilted up from its cruise position it has a forward cutout 12A at its leading edge 6 in the inboard area 8 corresponding to the forward portion 12 and an aft cutout 13A at its trailing edge 7 in said inboard area corresponding to the aft portion 13 whereby the spanwise wing lift distribution is greatly diminished when said wing is in a position other than its cruise position.

The most critical flight condition for tilt wing aircraft occurs during the transition from forward to hover flight. This condition determines the wing geometry and size. In the present invention, the notched wing, mounting a leading edge slot and a Fowler flap, enables the wing 5 to be ideally sized for high speed cruise, while providing ample area for transition. The powerful effect of the center section cutouts 12A and 13A, used in conjunction with slats and Fowler flaps, allows extremely high local wing angles of attack during the transition. This insures stall-free performance, even while decelerating at rates of 0.25 g throughout the transition.

The effect of the cutouts 12A and 13A is two-fold. First, it reduces the area of that portion of the wing that is not immersed in the slipstream, thus reducing any buffeting and hence fuselage and tail vibration. Secondly, it reduces the effective aspect ratio of the wing at the critical tilt angles to that of two smaller, low aspect ratio wings. The effect is an increase in induced drag. The lower aspect ratio also raises the angle of attack tolerance during the transition.

Aircraft engine and propeller assemblies 14 and 15 of any suitable known type are mounted on the wing 5 and extend forward of the leading edge 6 of said wing.

Part of the wing 5 extending from the vertical center of the fuselage 1 to one of the tip end areas 9 of said wing and part of said wing extending from said vertical center to the other of the tip end areas 10 behave essentially as separate wings, each having a span essentially extending from the corresponding side 2 and 3, respectively, of said fuselage and each having an aspect ratio considerably smaller than the aspect ratio of said wing as a whole. The reduction in the aspect ratio greatly increases the angle of attack attainable without separation during the movement of the wing 5 from its forward flight position.

The forward and aft cutouts 12A and 13A, respectively, produce a vortex along the sides 2 and 3 of the fuselage 1 which results in the spanwise wing lift distribution being substantially diminished when the wing 5 is in a position other than its forward position and reduces the intensity of center section buffet.

The aircraft has a center of gravity 18 and the wing 5 is forward swept, as seen in FIG. 1 and in the broken line FIG. 3, in a manner whereby the end tip areas 9 and 10 are above said center of gravity when said wing is in, or close to, its hover position, as shown by broken lines in FIG. 3. The wing 5 is also a cathedral structure, sloping down as it extends from the fuselage 1, as shown in FIG. 3 by solid lines.

The aircraft has airload centers 19 and 20 and a rudder 21 and the wing tip area 9 is pivotally mounted for rotation about an axis passing through the airload center 19. The wing tip area 10 is pivotally mounted for rotation about an axis passing through the airload center 20. Thus, angular deflection of the wing tip areas 9 and 10 in the slipstream of the propellers 16 and 17, respectively, produces fore and aft forces above the center of gravity 18 thereby Producing pitch control moments of said wing tip areas. Differential deflection of the wing tip areas 9 and 10 in the slipstream of the propellers 16 and 17, respectively, where one of said wing tips is up and the other is down, produces yaw control moments at angles when the wing 5 is in and close to its hover position, shown by broken lines in FIGS. 1, 2 and 3, and at low speeds, and also produces roll control at angles when said wing is in and close to its forward flight position, shown by solid lines in FIGS. 1, 2 and 3, and at higher speeds, wherein the rudder 21 effectuates yaw control.

Although shown and described in what is believed to be the most practical and preferred embodiment, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. A tilt wing VTOL aircraft having a fuselage having sides and an upper surface, said aircraft comprising
    an upper wing having a leading edge, a trailing edge, an inboard area adjacent said fuselage, spaced opposite end tip areas and an upper surface, said wing being pivotally mounted on said fuselage for rotation from a cruise flight position in which the upper surface of said wing is substantially flush with the upper surface of said fuselage to a hover position in which said wing is substantially perpendicular to said upper surface of said fuselage, said wing having a forward portion in the leading edge of said inboard area affixed to said fuselage and cut out of said wing and an aft portion in the trailing edge of said inboard area affixed to said fuselage and cut out of said wing, so that when said wing is in its cruise flight position it is whole, including said forward and aft portions, whereas when said wing is rotated from the cruise flight position it has a forward cutout at its leading edge in said inboard area corresponding to said forward portion and an aft cutout at its trailing edge in said inboard area corresponding to said aft portion, said forward and aft cutouts having areas sufficiently great to enable the spanwise wing lift distribution to be substantially diminished when said wing is in a position other than its cruise flight position, said wing being ideally sized for high speed cruise while providing ample area for transition and allowing extremely high local wing angles of attack during the transition, insuring stall-free performance even while decelerating at rates of 0.25 g through the transition and said cutouts reducing the area of the portion of said wing that is not immersed in the slipstream thereby reducing any buffeting and thus fuselage and tail vibration and reducing the effective aspect ratio of said wing at the critical tilt angles to that of two smaller low aspect ratio wings, resulting in increased induced drag and raised angle of attack tolerance during the transition; and
    aircraft engines with propellers mounted on said wing and extending forward of said leading edge of said wing.

2. A tilt wing VTOL aircraft as claimed in claim 1, wherein part of said wing extending from the vertical side of said fuselage to one of the tip end areas of said wing and the part of said wing extending from said vertical side of said fuselage to the other of said tip end areas behave essentially as separate wings, each having a span essentially extending from the corresponding tip to the corresponding side of said fuselage, thereby having an aspect ratio substantially smaller than the aspect ratio of said wing as a whole, the reduction in said aspect ratio substantially increasing the angle of attack attainable prior to flow separation on the upper surface of said wing when it is not in its cruise flight position, thus permitting low propeller power settings with the associated reduced bending downward of the flow when the wing is not in the cruise position.

3. A tilt wing VTOL aircraft as claimed in claim 1, wherein said wing has a portion which tilts and an aft end, said wing being pivotally mounted on the fuselage near the aft end of said wing portion which tilts, and each of said propellers being coupled to a corresponding one of said aircraft engines, whereby said forward and aft cutouts reduce the required flow bending by said propellers to avoid upper surface separation and permit low propeller power settings and more desirable performance when said wing is at transition tilt angles.

4. A tilt wing VTOL aircraft as claimed in claim 1, wherein said forward and aft cutouts produce a vortex along the sides of said fuselage which results in the spanwise wing lift distribution being substantially diminished when said wing is in a position other than its cruise position and reduces the intensity of center section buffet.

5. A tilt wing VTOL aircraft as claimed in claim 1, wherein said aircraft has a center of gravity and said wing is swept forward and said center of gravity and said forward sweep are arranged forward in a manner whereby said wing tip areas are above said center of gravity and the propeller slipstream when said wing is substantially in its hover position.

6. A tilt wing VTOL aircraft as claimed in claim 1, wherein said wing is a cathedral structure, sloping down as it extends from said fuselage.

7. A tilt wing VTOL aircraft as claimed in claim 3, wherein said aircraft has a center of gravity and airload centers and each of said wing tip areas is pivotally mounted for rotation about a spanwise axis passing through the airload center of said wing tip areas.

8. A tilt wing VTOL aircraft as claimed in claim 7, wherein differential deflection of said wing tip areas in the slipstream of said propellers produces yaw control moments at angles when said wing is substantially in its hover position and at low speeds, differential propeller thrust control and differential thrust deflection also producing roll control at angles when said wing is substantially in its cruise flight position at the higher speeds.

9. A tilt wing VTOL aircraft as claimed in claim 8, wherein said aircraft has a rudder which provides yaw control when said wing tilt is at or near the cruise flight position and provides roll control at such speeds.

10. A tilt wing VTOL aircraft having a center of gravity, airload centers, a fuselage having sides and an upper surface and a rudder, said aircraft comprising an upper wing having a leading edge, a trailing edge, an inboard area adjacent said fuselage, spaced opposite end tip areas, an upper surface and a portion which tilts and has an aft edge, said wing being pivotally mounted on said fuselage for rotation from a cruise flight position in which the upper surface of said wing is substantially flush with the upper surface of said fuselage to a hover position in which said wing is substantially perpendicular to said upper surface of said fuselage, said wing having a forward portion in the leading edge of said inboard area affixed to said fuselage and cut out of said wing and an aft portion in the trailing edge of said inboard area affixed to said fuselage and cut out of said wing, so that when said wing is in its cruise flight position it is whole, including said forward and aft portions, whereas when said wing is in a position other than its cruise flight position it has a forward cutout as its leading edge in said inboard area corresponding to said forward portion and an aft cutout at its trailing edge in said inboard area corresponding to said aft portion, said forward and aft cutouts having areas sufficiently great to enable the spanwise wing lift distribution to be substantially diminished, wherein said forward and aft cutouts produce a vortex along the sides of said fuselage which results in the spanwise wing lift distribution being substantially diminished when said wing is in a position other than its cruise flight position and reduces the intensity of center section buffet, wherein part of said wing extending from one side of said fuselage to one of the tip end areas of said wing and part of said wing extending from the other side of said fuselage to the other of said tip end areas behave essentially as separate wings, each having a span essentially extending from the corresponding tip to the corresponding side of said fuselage, thereby having an aspect ratio substantially smaller than the aspect ratio of said wing as a whole and thereby increasing the angle of attack attainable prior to flow separation of said wing upper surface after movement of said wing from its cruise flight position and reducing flow bending by the propeller to avoid said flow separation, wherein said wing is forward swept in manner whereby said end tip areas are above said center of gravity when said wing is substantially in its hover position, each of said wing tip areas being pivotal mounted for rotation about a spanwise axis passing said end tip areas whereby angular deflection of said wing areas in the slipstream of said propellers produces fore and aft forces above said center of gravity thereby producing pitch control moments and differential deflection of said wing tip areas in the slipstream of said propellers produces yaw control moments at angles when said wing is substantially in its hover position and at low speeds and also producing roll control at angles when said wing is substantially in its cruise flight position at higher speeds wherein said rudder effectuates yaw control; and aircraft engines with propellers mounted on said wing, the propellers extending forward of said leading edge of said wing, so that when said wing is in its cruise position the propellers are forward relative to the passenger area near the center of gravity.

11. A tilt wing VTOL aircraft as claimed in claim 10, wherein said wing is a cathedral structure, sloping down as it extends from said fuselage.

12. A tilt wing VTOL aircraft as claimed in claim 10, wherein each of said propellers is coupled to a corresponding one of said aircraft engines, whereby said forward and aft cutouts permit low propeller power settings and more desirable descent performance when said wing is in said hover position.

* * * * *

UNITED STATES PATENT AND TRADEMARK OFFICE
CERTIFICATE OF CORRECTION

PATENT NO. : 5,141,176
DATED : August 25, 1992
INVENTOR(S) : ROBERT W. KRESS and DAVID F. GEBHARD It is certified that error appears in the above—identified patent and that said Letters Patent is hereby corrected as shown below:

Col. 2, lines 66 to 68, change "and differential . . . position." to -- produces roll control in hover and can produce yaw control when the wing is in and close to its cruise flight position. However, the rudder on the vertical tail is more conveniently used for this function. Differential tip deflection produces roll control when the wing is in and close to its cruise flight position. Symmetrical wing tip deflection can be used to produce or augment pitch in conventional flight. However, the horizontal tail elevator is more convenient. --

Col. 3, lines 2 and 3, change "and . . . speeds." to --. Symmetrical wing tip deflection can be applied for pitch trim yielding an optimum tri-surface (wing, aft horizontal stabilizer and forward wing tips) aerodynamic configuration having minimum cruise drag with tail loads and aft fuselage bending loads reduced or eliminated. --

Col. 5, line 59, change "Producing" to -- producing --

Signed and Sealed this

Eleventh Day of January, 1994

Attest:

BRUCE LEHMAN

Attesting Officer     Commissioner of Patents and Trademarks